(12) United States Patent
Homyk et al.

(10) Patent No.: US 11,073,466 B2
(45) Date of Patent: Jul. 27, 2021

(54) SYSTEMS AND METHODS FOR MAINTAINING CONSTANT VOLUMETRIC FLOW RATES IN A FLUID CHANNEL

(71) Applicant: Verily Life Sciences LLC, South San Francisco, CA (US)

(72) Inventors: Andrew Homyk, Belmont, CA (US); Saurabh Vyawahare, Mountain View, CA (US)

(73) Assignee: VERILY LIFE SCIENCES LLC

( * ) Notice: Subject to any disclaimer, the term of this patent is extended or adjusted under 35 U.S.C. 154(b) by 17 days.

(21) Appl. No.: 16/585,687

(22) Filed: Sep. 27, 2019

(65) Prior Publication Data

US 2020/0110020 A1 Apr. 9, 2020

Related U.S. Application Data

(60) Provisional application No. 62/740,696, filed on Oct. 3, 2018.

(51) Int. Cl.
*G01N 15/14* (2006.01)

(52) U.S. Cl.
CPC ..... *G01N 15/1404* (2013.01); *G01N 15/1425* (2013.01); *G01N 15/1484* (2013.01); *G01N 2015/149* (2013.01)

(58) Field of Classification Search
CPC ........... G01N 15/1404; G01N 15/1425; G01N 15/1484; G01N 2015/149;

(Continued)

(56) References Cited

U.S. PATENT DOCUMENTS

| 4,683,212 A * | 7/1987 | Uffenheimer ...... G01N 15/1404 137/571 |
| 5,410,403 A * | 4/1995 | Wells ................. G01N 15/1404 356/335 |

(Continued)

FOREIGN PATENT DOCUMENTS

| CH | 705287 | 6/2012 |
| EP | 3318328 | 5/2018 |

OTHER PUBLICATIONS

Cai et al., "Closed-Loop Control of Chemical Injection Rate for a Direct Nozzle Injection System", Sensors, 16, 127, Jan. 20, 2016, 11 pages.

(Continued)

*Primary Examiner* — Michael P LaPage
(74) *Attorney, Agent, or Firm* — Kilpatrick Townsend & Stockton LLP

(57) ABSTRACT

Disclosed herein are systems and methods capable of identifying, tracking, and sorting particles flowing in a channel, for example, a microfluidic channel having a fluid medium. The channel and the fluid medium can have a similar refractive index such that they appear translucent or transparent when illuminated by electromagnetic radiation. The particles can have a refractive index substantially different from that of the channel and the medium, such that the particles interfere with the electromagnetic radiation. A sensor can be disposed adjacent to the channel to record the electromagnetic radiation. The sensor can be used for identifying, tracking, and sorting the particles.

10 Claims, 6 Drawing Sheets

(58) Field of Classification Search
CPC ..... B01L 2200/0652; B01L 2200/0673; B01L 2300/0663; B01L 2400/0424; B01L 3/502761
See application file for complete search history.

(56) References Cited

U.S. PATENT DOCUMENTS

| | | |
|---|---|---|
| 6,432,630 B1 | 8/2002 | Blankenstein |
| 7,695,687 B2 | 4/2010 | Delamarche et al. |
| 2009/0032449 A1* | 2/2009 | Mueth .................. B04B 13/00 210/94 |
| 2011/0000560 A1* | 1/2011 | Miller ............... B01L 3/502715 137/561 R |
| 2011/0065181 A1* | 3/2011 | Hvichia ............... G01N 33/491 435/325 |
| 2011/0088786 A1 | 4/2011 | Bartos et al. |
| 2011/0303586 A1* | 12/2011 | Sim .................... G01N 30/0005 209/268 |
| 2018/0298324 A1* | 10/2018 | Takeda ................... C12M 33/04 |
| 2018/0299362 A1* | 10/2018 | Kimmerling ...... G01N 15/0618 |

OTHER PUBLICATIONS

PCT/US2019/053451, "International Search Report and Written Opinion", dated Dec. 17, 2019, 12 pages.

* cited by examiner

SYSTEMS AND METHODS FOR MAINTAINING CONSTANT VOLUMETRIC FLOW RATES IN A FLUID CHANNEL

CROSS-REFERENCE TO RELATED APPLICATION

This application claims the benefit of priority to U.S. Provisional Application No. 62/740,696, filed Oct. 3, 2018, the entire contents of which are incorporated by reference herein for all purposes.

BACKGROUND

Microfluidic methods and systems that require identifying, tracking, and sorting of cells, particulates, cell-like or particulate-like materials, or droplets of immiscible materials dispersed in a medium constitute a rapidly progressing field. Current systems however lack speed and accuracy due, at least in part, to fluctuations in the systems.

SUMMARY

The present disclosure provides a method of controlling a volumetric flow rate in a microfluidic sorting system for cells, particulates, cell-like or particulate-like materials, or droplets of immiscible materials dispersed in a medium (collectively referred to herein as particles). The steps of the method include passing a medium containing a plurality of particles through a primary channel at a selected rate to a sensor to sense at least a subset of the particles, passing the medium with the sensed subset of particles to a first sorting junction comprising the primary channel connected to a first secondary channel and a second secondary channel, sorting the sensed subset of particles from the primary channel into the first secondary channel, and reinjecting a medium devoid of particles from the second secondary channel into the primary channel. Reinjection of the medium from the second secondary channel maintains the selected volumetric flow rate in the primary channel. In certain embodiments, the selected volumetric flow rate controls inter-particle spacing, inter-particle timing, particle positioning, or any combination thereof, within at least the primary channel, and/or within at least the first secondary channel. In some cases, the method includes manipulating the inter-particle spacing, the inter-particle timing, and/or the particle positioning. For example, the manipulating includes maintaining a constant inter-particle spacing and a constant inter-particle timing within the plurality of particles, varying the inter-particle spacing and inter-particle timing within the plurality of particles, grouping a subset of particles, agglomerating a subset of particles, or any combination thereof.

In certain embodiments, the sorting includes dielectrophoretic manipulating and carrying by the medium. The dielectrophoretic manipulating optionally comprises inducing a dipole moment in the subset of particles. The dipole moment in the subset of particles forces the subset of particles into the first secondary channel. Carrying by the medium comprises employing an initial volumetric flow rate of the medium flowing into the first secondary channel with the subset of particles. As described herein, reinjecting the medium devoid of particles (or substantially devoid of particles) includes reinjecting a volumetric flow rate of the medium equal to the volumetric flow rate of the medium flowing into the first secondary channel with the sensed subset of particles.

The present disclosure also provides a microfluidic particle sorting system with a controlled volumetric flow rate. The system includes a primary channel comprising a medium containing a plurality of particles; a first sensor to sense at least a subset of particles in the plurality of particles, wherein the first sensor is positioned adjacent to the primary channel; a first secondary channel configured to receive from the primary channel at least a subset of the medium containing the plurality of particles; a second secondary channel configured to reinject at least the subset of the medium received by the first secondary channel, and a medium pump system, wherein the medium pump system is configured to maintain a volumetric flow rate of the medium in the system.

As described herein, a sorting junction includes the first secondary channel connected to the primary channel and the second secondary channel connected to the primary channel downstream of the first secondary channel. In certain embodiments, the sorting junction can be a two-dimensional junction or a three-dimensional junction. In certain embodiments, the system includes a plurality of sorting junctions.

In some cases, the first secondary channel is configured to receive at least a subset of particles from the medium containing a plurality of particles. Additionally, the second secondary channel is configured to receive a medium lacking the subset of particles that are sorted into the first channel at an initial volumetric flow rate and to supply a volumetric flow rate of medium devoid of the subset of particles (i.e., medium from which the particles are removed at least in part) to the primary channel at the initial rate. As described herein, a volumetric flow rate of the medium devoid of the subset of particles is equal to a volumetric flow rate of a medium received by the first secondary channel.

The system optionally includes a medium inlet and a medium manifold configured to supply medium to at least the second secondary channel, and in some cases the medium manifold is configured to supply a plurality of second secondary channels. As described herein, the medium manifold system is an ideal medium source.

This summary is a high-level overview of various aspects of the disclosure and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this disclosure, any or all drawings and each claim.

BRIEF DESCRIPTION OF THE DRAWINGS

In the following detailed description, reference is made to the accompanying figures, which form a part hereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

DETAILED DESCRIPTION

I. Overview

Figure 1:
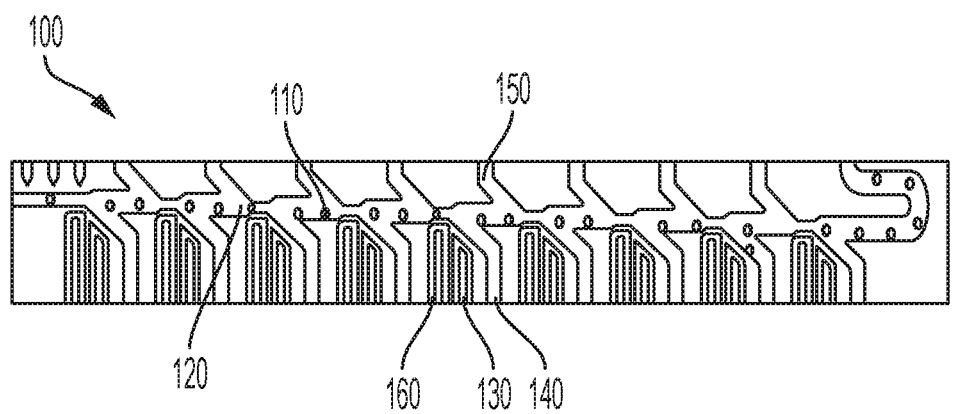
FIG. 1 is an illustration of a micrograph showing droplets flowing in a channel according to an embodiment described herein.
Figure 2A:
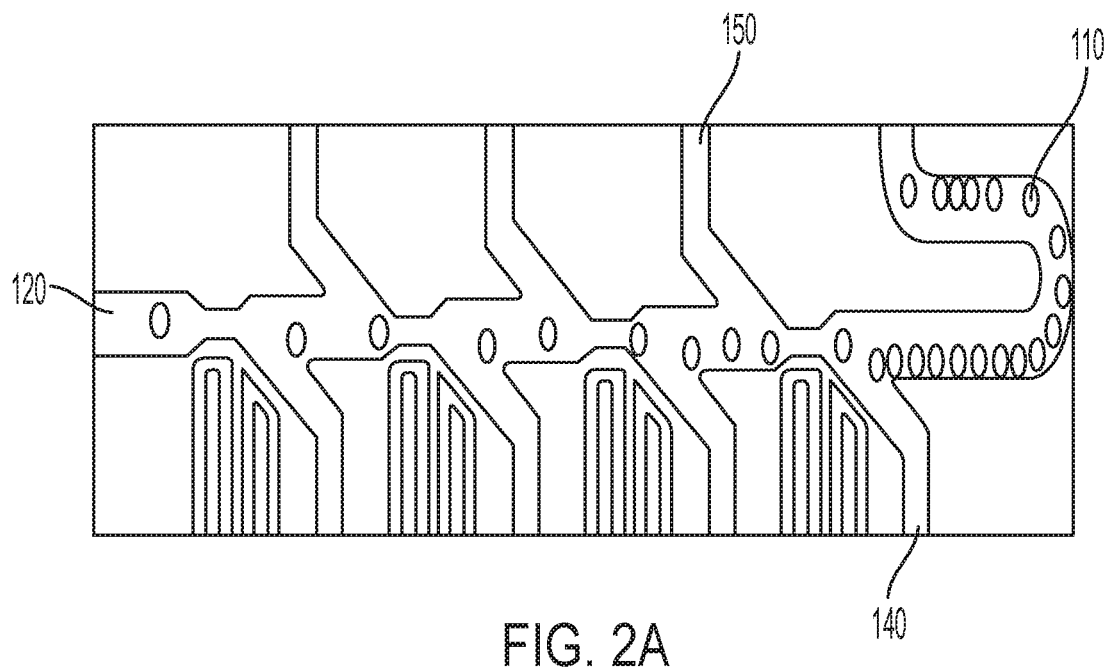
FIG. 2A is an illustration of a micrograph showing droplets flowing in a channel according to an embodiment described herein.
Figure 2B:
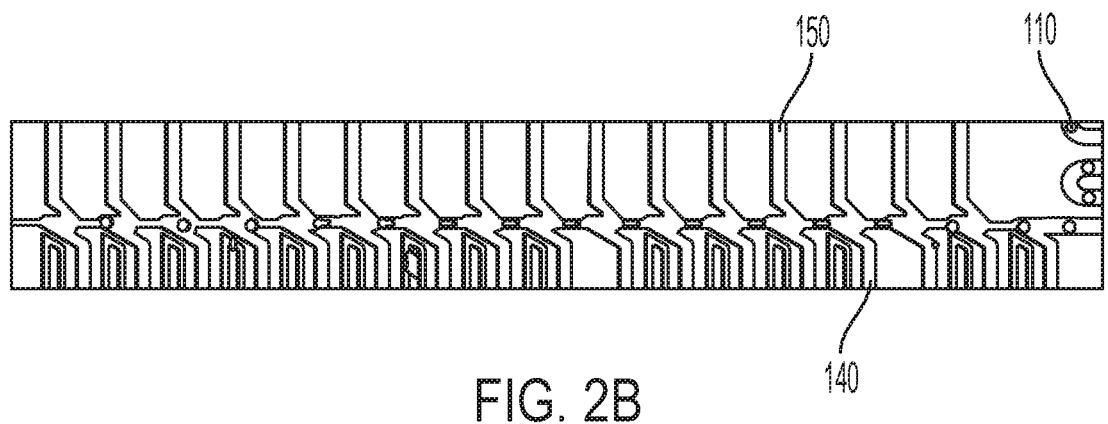
FIG. 2B is an illustration of a micrograph showing droplets flowing in a channel according to an embodiment described herein.
Figure 2C:
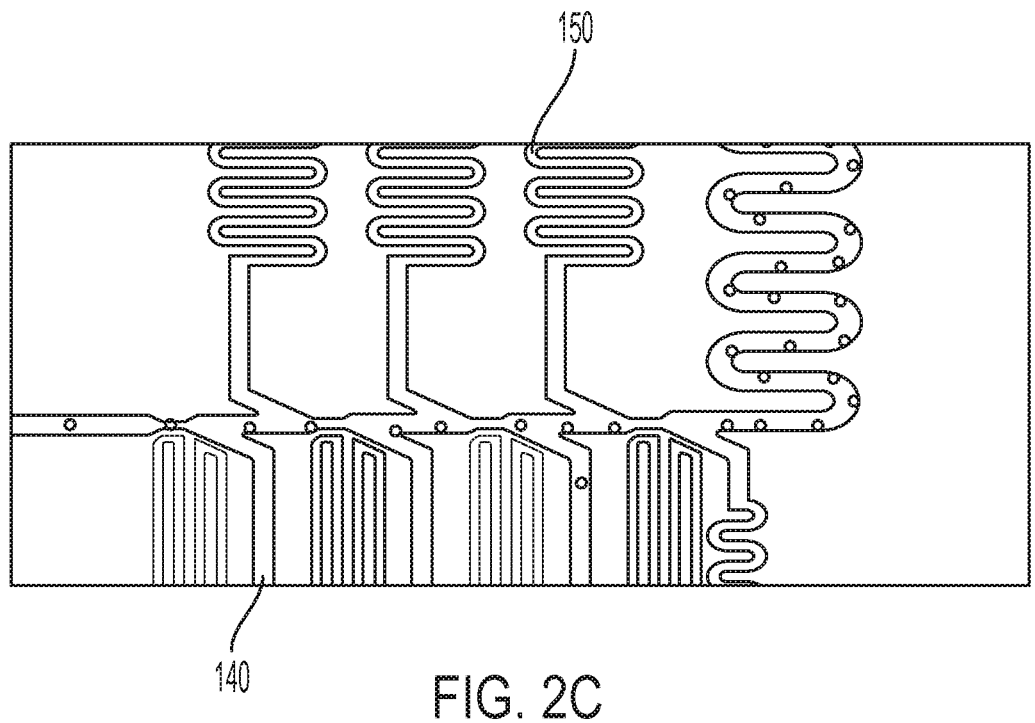
FIG. 2C is an illustration of a micrograph showing droplets flowing in a channel according to an embodiment described herein.
Figure 2D:
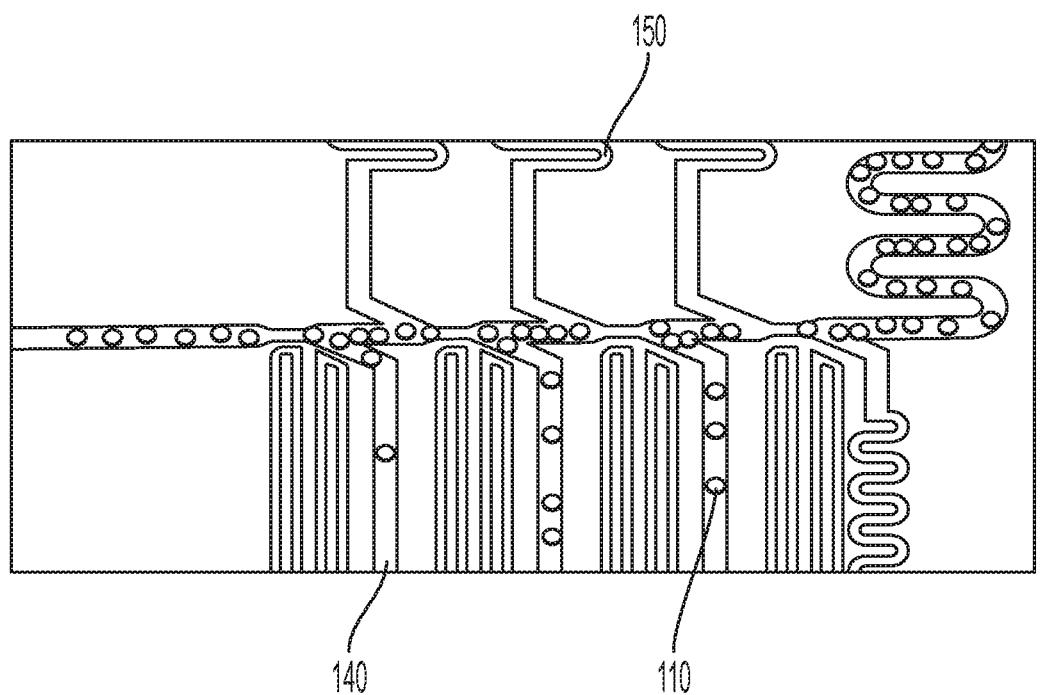
FIG. 2D is an illustration of a micrograph showing droplets flowing in a channel according to an embodiment described herein.

Certain aspects and features of the present disclosure relate to controlling a volume of material (e.g., containing cells, particles, droplets, or cell-like or particle-like materials) in a microfluidic system. More particularly, certain aspects and features of the present disclosure relate to controlling a volume of a medium containing cells, particles, or cell-like or particle-like materials (referred to herein as particles) in a primary channel, and in some embodiments, specifically to cell sorting (e.g., fluorescence activated cell sorting (FACS)). Disclosed herein are systems and methods capable of identifying, tracking, and sorting particles flowing in a primary channel and controlling position, speed, and spacing between the particles. The primary channel can be a microfluidic channel disposed onto or within a substrate. The primary channel can further include a medium in which the particles are carried (i.e., such that the particles flow through the primary channel in the medium). A sensor can be disposed adjacent to the primary channel to sense the particles. The sensor can be attached to a system for identifying, tracking, and sorting the particles. A plurality of channels can converge to form a sorting junction. For example, a first secondary channel can be attached to the primary channel, with the first secondary channel configured to receive sorted particles and medium in which they are carried. A second secondary channel can be attached to the primary channel, with the second secondary channel configured to reinject a volume of the medium received by the first secondary channel back into the primary channel. It is noted that description embodiments described for compositions may also be incorporated in methods and/or systems and vice versa.

II. Definitions

Unless defined otherwise, all technical and scientific terms used herein have the same meaning as is commonly understood by one of ordinary skill in the art to which this disclosure belongs. All patents, applications, published applications and other publications referred to herein are incorporated by reference in their entireties. If a definition set forth in this section is contrary to or otherwise inconsistent with a definition set forth in the patents, applications, published applications and other publications that are herein incorporated by reference, the definition set forth in this section prevails over the definition that is incorporated herein by reference.

When introducing elements of the present disclosure or the embodiment(s) thereof, the articles "a", "an", "the" and "said" are intended to mean that there are one or more of the elements. The terms "comprising", "including" and "having" are intended to be inclusive and mean that there may be additional elements other than the listed elements. It is understood that aspects and embodiments of the disclosure described herein include "consisting" and/or "consisting essentially of" aspects and embodiments.

The term "and/or" when used in a list of two or more items, means that any one of the listed items can be employed by itself or in combination with any one or more of the listed items. For example, the expression "A and/or B" is intended to mean either or both of A and B, i.e. A alone, B alone or A and B in combination. The expression "A, B and/or C" is intended to mean A alone, B alone, C alone, A and B in combination, A and C in combination, B and C in combination or A, B, and C in combination.

The term "particle" is used throughout as an exemplar. "Particles," as used herein can include cells, particulates, liposomes, microsomes, gas, and the like. As used herein the particles are generally present in a medium or droplet thereof.

The term "medium" refers to an aqueous or oil-based fluid that serves as the carrier of the particles within a microfluidic system.

Various aspects of this disclosure are presented in a range format. It should be understood that the description in range format is merely for convenience and brevity and should not be construed as an inflexible limitation on the scope of the disclosure. Accordingly, the description of a range should be considered to have specifically disclosed all the possible sub-ranges as well as individual numerical values within that range. For example, description of a range such as from 1 to 6 should be considered to have specifically disclosed sub-ranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

As used herein, an "ideal medium source" is a source that does not deviate in its supply, i.e., it provides a constant volume system. As used herein, "constant volume" is meant a volume that deviates by no more than up to about 10% (e.g., no more than up to about 0.1%, 0.2%, 0.3%, 0.4%, 0.5%, 0.6%, 0.7%, 0.8%, 0.9%, 1%, 1.1%, 1.2%, 1.3%, 1.4%, 1.5%, 1.6%, 1.7%, 1.8%, 1.9%, 2%, 2.1%, 2.2%, 2.3%, 2.4%, 2.5%, 2.6%, 2.7%, 2.8%, 2.9%, 3%, 3.1%, 3.2%, 3.3%, 3.4%, 3.5%, 3.6%, 3.7%, 3.8%, 3.9%, 4%, 4.1%, 4.2%, 4.3%, 4.4%, 4.5%, 4.6%, 4.7%, 4.8%, 4.9%, 5%, 5.1%, 5.2%, 5.3%, 5.4%, 5.5%, 5.6%, 5.7%, 5.8%, 5.9%, 6%, 6.1%, 6.2%, 6.3%, 6.4%, 6.5%, 6.6%, 6.7%, 6.8%, 6.9%, 7%, 7.1%, 7.2%, 7.3%, 7.4%, 7.5%, 7.6%, 7.7%, 7.8%, 7.9%, 8%, 8.1%, 8.2%, 8.3%, 8.4%, 8.5%, 8.6%, 8.7%, 8.8%, 8.9%, 9%, 9.1%, 9.2%, 9.3%, 9.4%, 9.5%, 9.6%, 9.7%, 9.8%, 9.9%, or 10%). In some cases, the volume does not deviate (e.g., the volume deviates by 0%).

Other objects, advantages and features of the present disclosure will become apparent from the following specification taken in conjunction with the accompanying drawings.

III. Systems

Disclosed herein is a system for sorting particles in a primary channel, including a primary channel having a particle dispersed in a medium, such that the particle or the droplet is moving from a first end of the primary channel to a second end of the primary channel, a sensor to sense the particle, wherein the sensor is positioned adjacent to the primary channel, a sorting junction configured to sort sensed particles, and one or more secondary channels configured to receive the sorted particles and to simultaneously maintain the volume of the medium in the primary channel, and a medium pump system.

In certain embodiments, the sorting junction includes the convergence of the first secondary channel and the second secondary channel at the primary channel. FIG. 1 is an illustration of a micrograph showing a flow-controlled particle sorting system 100 as described herein. In the example of FIG. 1, a water droplet 110 can be dispersed in an oil medium (not visible) and flowed through a primary channel 120. The water droplet 110 can flow past a sensor (e.g., an optical sensor, not shown). In some non-limiting examples, the sensor can be configured to sense an electric field of the particles, a magnetic field of the particles, electromagnetic radiation of the particles, interference caused by the particles, light scattering caused by the particles, any other suitable sensible attribute of the particles, or any combination thereof. The water droplet 110 can then flow into the sorting junction including the first secondary channel 140 and the second secondary channel 150. If the sensor indicates the water droplet 110 should be sorted, in the example of FIG. 1, a first electrode 130 and a second electrode 160 can be activated to induce a dipole moment in the water droplet 110 and to dielectrophoretically force the water droplet 110 to flow into the first secondary channel 140. In some cases, during a sorting operation, a volume of the oil medium flows into the first secondary channel 140. As such, a total volume of the primary channel decreases, which can disrupt the flow of the particles. Thus, the volume of the oil medium flowing into the first secondary channel 140 can be replaced by reinjecting an equal volume of oil medium from the second secondary channel 150. In certain aspects, the volume of the oil medium flowing into the first secondary channel 140 can be replaced by reinjecting an equal volume of oil medium from a plurality of second secondary channels 150 (e.g., a pair of second secondary channels 150 can be used in concert to replace the volume of oil flowing into a single first secondary channel 140).

In some non-limiting examples, the flow-controlled particle sorting system 100 is positioned in or on a substrate. In some cases, the substrate can be a silicon wafer substrate, a polymer substrate (e.g., a poly(dimethylsiloxane) (PDMS) substrate, a poly(methyl methacrylate) (PMMA) substrate, a cyclic olefin copolymer (COC) substrate, a cyclo-olefin polymer (COP) substrate, a polycarbonate (PC) substrate, or a polystyrene (PS) substrate), a gallium arsenide wafer substrate, a glass substrate, a ceramic substrate (e.g., a yttrium stabilized zirconia (YSZ) substrate), or any suitable substrate. In some cases, the substrate can have additional surface layers, for example, electrodes, coatings, surface functionalizations, or the like. In some non-limiting examples, the flow-controlled particle sorting system 100 can be positioned within the substrate. For example, the flow-controlled particle sorting system 100 can be created by creating a channel or passage or a network of channels or passages in a substrate. Optionally the passages are created by aligning a first substrate with a channel or network of channels and a second substrate with corresponding channels or networks of channels (e.g., a mirrored channel or network of channels) and aligning and joining the first substrate to the second substrate such that the channels within the first and second substrates align to form passages through the joined substrates.

In certain examples, the flow-controlled particle sorting system 100 can be at least partially exposed to the environment outside of the substrate. For example, a portion of the substrate can be removed in a predetermined pattern creating an exposed channel or network of channels positioned at least partially within the substrate, such that any medium and/or particles (e.g., cells, particulates, liposomes, or the like) are exposed to the environment outside of the substrate when flowing through the flow-controlled particle sorting system 100. The portion of the substrate can be removed by any one of reactive ion etching (i.e., dry etching), wet chemical etching (i.e., wet etching), electron beam (E-beam) lithography, photolithography (e.g., photolithography employing dry etching and/or wet etching), laser etching, any suitable material removal technique, or any combination thereof. In some further examples, the flow-controlled particle sorting system 100 can be fabricated on the substrate. For example, the flow-controlled particle sorting system 100 can be created by depositing a material onto the substrate, removing at least a portion of the material in a predetermined pattern (e.g., in the shape of a channel or a network of channels) to create a channel or network of channels within the material deposited onto the substrate. The portion of the material deposited onto the substrate can be removed by any one of reactive ion etching (i.e., dry etching), wet chemical etching (i.e., wet etching), E-beam lithography, photolithography (e.g., photolithography employing dry etching and/or wet etching), laser etching, soft lithography, two-photon lithography, forming the channel around a sacrificial template, any suitable material removal technique, or any combination thereof. In certain embodiments, the flow-controlled particle sorting system 100 can be created by injection molding, embossing, molding around non-sacrificial templates, computer numerical control (CNC) fabrication, electrical discharge machining (EDM), 3-D printing, any suitable fabrication technique, or any combination thereof.

In certain embodiments, the first secondary channel 140 and the second secondary channel 150 creating the sorting junction can be positioned relative to each other in any suitable geometry. For example, the second secondary channel 150 can be positioned downstream of the first secondary channel 140. In some cases, the second secondary channel 150 can be positioned upstream of the first secondary channel 140. In some cases, the first secondary channel 140 and the second secondary channel 150 can be positioned on opposite sides of the primary channel 120. In some cases, the first secondary channel 140 and the second secondary channel 150 can be positioned on the same side of the primary channel 120. When the flow-controlled particle sorting system 100 is in a three-dimensional configuration, the first secondary channel 140 and the second secondary channel 150 can be positioned angularly about a linear axis of the primary channel 120 (e.g., the primary channel 120 and the first secondary channel 140 can be in a first plane and the second secondary channel 150 can connect to the primary channel 120 at any suitable angle to that plane). Thus, the sorting junction can have any suitable geometry.

Also, as noted herein, the channel or passage or network of channels or passages of the flow-controlled particle sorting system 100 may be configured in a variety of shapes. The channel or passage or network of channels or passages can have a square shape, a rectangular shape, a triangular shape, a circular shape, an elliptical shape, or any suitable shape In certain embodiments, for example, the channel or passage network of channels or passages can have any two dimensional (2D) cross section and/or three dimensional (3D) shape. Thus, the cross section of the channel or passage or network of channels or passages can be a rectangle, square, circle, ellipse, polygon, parallelogram, triangle, any combination thereof, or any suitable shape.

The channel or passages, or network of channels or passages disclosed herein may be configured in a variety of sizes. Round channels (including channels in a network of channels) can have a diameter of from about 500 nm to about 10 mm (e.g., from about 750 nm to about 7.5 mm, from about 1 micron (μm) to about 5 mm, or from about 5 m to about 1 mm). For example, round channels can have a diameter of 500 nm, 600 nm, 700 nm, 800 nm, 900 nm, 1 μm, 5 μm, 10 μm, 20 μm, 30 μm, 40 μm, 50 μm, 60 μm, 70 μm, 80 μm, 90 μm, 100 μm, 200 μm, 300 μm, 400 μm, 500 μm, 600 μm, 700 μm, 800 μm, 900 μm, 1 mm, 5 mm, 10 mm, or anywhere in between. Rectangular channels can have a width of from about 500 nm to about 10 mm (e.g., from about 750 nm to about 7.5 mm, from about 1 micron (μm) to about 5 mm, or from about 5 m to about 1 mm). Rectangular channels can have a depth of from about 500 nm to about 10 mm (e.g., from about 750 nm to about 7.5 mm, from about 1 micron (μm) to about 5 mm, or from about 5 m to about 1 mm).

The medium can be at least partially contained within a channel or passage, wherein the channel or passage can be fashioned as a plurality of channels or passages, or a network of channels or passages, and may include one or more of a reservoir, an inlet, an outlet, a source, a drain, or any combination thereof. In some non-limiting examples, the reservoir is a syringe (e.g., a manually operated syringe, or a syringe pump operated syringe), a pressurized fluid vessel, a fluid vessel driven by a peristaltic pump, any suitable fluid vessel, or any combination thereof. The passage or network of passages can be contained within the substrate. The channel or plurality of channels can be disposed on a surface of the substrate such that the medium can be exposed to any environment in which the substrate can be placed. Optionally, only a portion of the channel or network of channels is exposed to the environment of the substrate.

In some non-limiting examples, a channel or passage can have at least a first end and a second end. In some examples, the substrate can have a first port disposed on a surface of the substrate, wherein the first port can be an inlet. The inlet can expose at least part of a channel disposed within the substrate to the exterior of the substrate, enabling filling the channel with a medium (e.g., oil, aqueous, any suitable medium or combination thereof) and/or the particles. In some cases, the substrate can have a plurality of inlets. The inlet can optionally be sealed after filling the channel with the medium and/or the particles. Sealing the inlet can include gluing, pinching, clamping, recasting (e.g., melting the inlet material and allowing the material to solidify in a sealed state), or plugging. Optionally, the substrate can have a second port disposed on a surface of the substrate, wherein the second port can be an outlet. The outlet can expose at least part of a channel disposed within the substrate to the exterior of the substrate, enabling draining the channel of the medium and/or the particles. The outlet can optionally be opened after filling the channel with the medium and/or the particles to drain the channel. Opening the outlet can include dissolving glue, unpinching, unclamping, melting, piercing, or unplugging.

In some embodiments, a plurality of channels or passages can be formed in a substrate to create a network of channels or passages. The channels or passages can intersect in two dimensions (e.g., in a single plane) and/or in three dimensions. For example, the channels or passages can intersect at any suitable angle (e.g., about 1° to about 359°, or anywhere in between) in a single plane. In some further examples, the channels or passages can intersect across a plurality of planes (i.e., the channels or passages can be formed into interplanar interconnects). In a still further example, the channels or passages can intersect within a single plane and across a plurality of planes. In still further examples, the channel or passage can have a three dimensional shape. For example, the channel can be a coil, a toroid, an arc, or a helix.

In certain embodiments, the sensor can be a linear charge-coupled sensor, a complementary metal-on-silicon (CMOS) sensor, a field sensor, a capacitive sensor, an optical sensor, a resistive sensor, an inductive sensor, a time of flight sensor, a camera (e.g., a high-speed camera), any suitable sensor, or any combination thereof. In some aspects, the sensor can be placed adjacent to the channel. For example, the sensor can be suspended above the channel (e.g., when the channel is placed partially within the substrate or onto the substrate), the sensor can be placed beneath the substrate (e.g., the substrate can be placed onto the sensor).

In some non-limiting examples, the sensor can detect spectral information about one or more types of particles. For example, the sensor can be coupled to a fluorescence spectrometer, an absorption spectrometer, an optical spectrometer, any suitable spectrophotometer, or any combination thereof (e.g., when employed in a fluorescence activated cell sorting (FACS) system). In some aspects, an illumination source can provide excitation energy. For example, when the particle is a fluorescent particle, the illumination source can provide electromagnetic (EM) radiation sufficient to excite the fluorescent particle such that the fluorescent particle fluoresces. Thus, the sensor can characterize the fluorescence of the particle. In some non-limiting examples, spectral information of the particle can be employed to identify the particle or droplet for sorting.

In some cases, the particle is a cell, a liposome, a bead, any suitable material dispersed in a medium (e.g., an aqueous material in an oil medium or an oil material in an aqueous medium), or any combination thereof. In certain embodiments, the particle can have a diameter of from about 50 nm to about 1 mm. For example, the particle can have a diameter of about 50 nm, about 60 nm, about 70 nm, about 80 nm, about 90 nm, about 100 nm, about 200 nm, about 300 nm, about 400 nm, about 500 nm, about 600 nm, about 700 nm, about 800 nm, about 900 nm, about 1 μm, about m, about 20 μm, about 30 μm, about 40 μm, about 50 μm, about 60 µm, about 70 µm, about 80 µm, about 90 µm, about 100 µm, about 110 µm, about 120 µm, about 130 µm, about 140 µm, about 150 µm, about 160 µm, about 170 µm, about 180 µm, about 190 µm, about 200 µm, about 210 µm, about 220 µm, about 230 µm, about 240 µm, about 250 µm, about 260 µm, about 270 m, about 280 µm, about 290 µm, about 300 µm, about 310 µm, about 320 µm, about 330 µm, about 340 µm, about 350 µm, about 360 µm, about 370 µm, about 380 µm, about 390 µm, about 400 µm, about 410 µm, about 420 µm, about 430 µm, about 440 µm, about 450 µm, about 460 µm, about 470 µm, about 480 µm, about 490 µm, about 500 µm, about 510 µm, about 520 µm, about 530 µm, about 540 µm, about 550 µm, about 560 µm, about 570 µm, about 580 µm, about 590 µm, about 600 µm, about 610 µm, about 620 µm, about 630 µm, about 640 µm, about 650 m, about 660 µm, about 670 µm, about 680 µm, about 690 µm, about 700 µm, about 710 µm, about 720 µm, about 730 µm, about 740 µm, about 750 µm, about 760 µm, about 770 µm, about 780 µm, about 790 µm, about 800 µm, about 810 µm, about 820 µm, about 830 µm, about 840 m, about 850 µm, about 860 µm, about 870 µm, about 880 µm, about 890 µm, about 900 µm, about 910 µm, about 920 µm, about 930 µm, about 940 µm, about 950 µm, about 960 µm, about 970 µm, about 980 µm, about 990 µm, about 1 mm, or anywhere in between.

In some aspects, the particle or the droplet can move through the channel at a rate of from about 0.0001 meters per second (m/s) to about 10 m/s. For example, the particle or droplet can move at a rate of about 0.0001 m/s, 0.001 m/s, 0.01 m/s, about 0.05 m/s, about 0.1 m/s, about 0.5 m/s, about 1 m/s, about 1.5 m/s, about 2 m/s, about 2.5 m/s, about 3 m/s, about 3.5 m/s, about 4 m/s, about 4.5 m/s, about 5 m/s, about 5.5 m/s, about 6 m/s, about 6.5 m/s, about 7 m/s, about 7.5 m/s, about 8 m/s, about 8.5 m/s, about 9 m/s, about 9.5 m/s, about 10 m/s, or anywhere in between.

In certain embodiments, a plurality of particles can be sensed by the sensor and sorted at a high rate (i.e., processed). In some cases, the plurality of particles can be processed at a rate of from about 1 per second to about 10,000 per second (/s). For example, the particles can be processed at a rate of about 1/s, about 5/s, about 10/s, about 50/s, about 100/s, about 500/s, about 1000/s, about 1500/s, about 2000/s, about 2500/s, about 3000/s, about 3500/s, about 4000/s, about 4500/s, about 5000/s, about 5500/s, about 6000/s, about 6500/s, about 7000/s, about 7500/s, about 8000/s, about 8500/s, about 9000/s, about 9500/s, about 10,000/s, or anywhere in between.

In some aspects, signals from the sensor are used to modulate a device that is separate from or integral to the system (e.g., a component for sorting the plurality of particles in a channel based on the size, position and/or other characteristics). In some non-limiting examples, the device that is integral to the system is an electrode, a valve (e.g., an electronic valve, a pneumatic valve, a hydraulic valve, any suitable valve, or any combination thereof), a switch, a magnet, an acoustic wave, any suitable particle directing device, or any combination thereof. In some non-limiting examples, the electrode can manipulate the particle or droplet via dielectrophoresis. As used herein, dielectrophoresis includes inducing a dipole moment in the particle to be sorted. The dipole moment can be further used to manipulate the particle or droplet by modulating an electric field produced by the electrode to force the particle or droplet to change direction in the primary channel 120 (see FIG. 1). Changing direction can include being directed into, for example, the first secondary channel 140.

In some cases, the device that is separate from the system is an analytical tool (e.g., a spectrophotometer), a display (e.g., for reporting data, or for providing analysis by a lab-on-a-chip device), a heating or cooling source, any suitable device, or any combination thereof.

IV. Methods

Described herein is a method of maintaining a constant volumetric flow rate in a flow-controlled particle sorting system 100 (see FIG. 1) including passing a medium containing a plurality of particles through a primary channel at a selected rate to a sensor to sense at least a subset of the particles, passing the medium with the sensed subset of particles to a first sorting junction (including the primary channel 120 connected to the first secondary channel 140 and the second secondary channel 150), sorting all or a portion of the sensed subset of particles from the primary channel 120 into the first secondary channel 140, and reinjecting a medium devoid of or substantially devoid of particles from the second secondary channel 150 into the primary channel 120, wherein the reinjection of the medium from the second secondary channel 150 maintains the selected volumetric flow rate in the primary channel 120.

In certain embodiments, allowing the particle to flow through the flow-controlled particle sorting system 100 can be a laboratory method (e.g., analyzing a biological sample), a lab-on-a-chip method (e.g., analyzing fluids at a point of care), any suitable method wherein a plurality of particles to be detected or sorted are suspended in a medium and require analysis, or any combination thereof.

In some cases, the sensing is designed to detect one selected particle but can be designed to detect and distinguish multiple particle types. Optionally, sensing is performed in real time (e.g., sensing the particles can be instantaneous such that a desired action can be taken in response to the identification of the particle, e.g., sorting based on the signal from the sensor). In some non-limiting examples, sensing can further include characterizing the particles. Characterizing the particles can include identifying the particle, recording a velocity of the particle, recording an acceleration of the particle, recording a size of the particle, or any combination thereof). Characterizing the particle can be performed employing any suitable characterization systems or methods able to use information captured by the sensor. For example, illuminating the channel with electromagnetic radiation can include transmitting a wavelength of light that can excite an aspect of the particle and stimulate fluorescence. The fluorescence can be recorded by a spectrophotometer coupled to the sensor and the particle can be identified by its fluorescent spectrum.

In certain cases, sensing the particles can be used to monitor operation of the system. For example, a deviation in particle flow rate and/or particle spacing can indicate a problem in the system (e.g., a clog, a bubble, a rupture, a fracture, any suitable microfluidic channel anomaly, or any combination thereof). Further, sensing the particles can be used to alleviate the problems described above by any one of repair, replacement, correction, or maintenance. Additionally, sensing the particles and identifying problems can further identify erroneous data for optimum analytic results.

In some aspects, the method further includes sorting a plurality of particles in real time according to particle identification, particle size, or based on any suitable, detectable attribute. In certain embodiments, the plurality of particles can include various different particles requiring sorting for analytical, research, or any suitable purpose. Optionally the plurality of particles are selectively sorted at a first sorting junction, a second sorting junction, a third sorting junction, etc. such that a first particle type is sorted at the first sorting junction, a second type of particles is sorted at a second sorting junction, and a third type of particle is sorted at a third sorting junction, and the like.

The sorting can be performed by actuating at least an electrode, valve or other component that may be used to modulate flow through the channel. In some aspects, the sorting can be performed based on information detected by the sensor. In certain embodiments, actuating an electrode can produce an electric field within and/or across the primary channel 120 capable of redirecting the particles flowing in the primary channel 120 into a secondary channel or reservoir (e.g., as in a network system including a plurality of channels described above). As described above, the electrode can manipulate the particles via dielectrophoresis (e.g., inducing a dipole moment in the particles to be sorted and manipulating the particles by modulating an electric field produced by the electrode).

In some cases, sorting is performed by directing the particles into a secondary channel connected to the primary channel 120 (e.g., the first secondary channel 140 as in the example of FIG. 1). Directing the particles into the first secondary channel 140 further includes directing a portion of the medium (e.g., the oil medium as described above) into the first secondary channel (i.e., a portion of the medium carries the particles into the first secondary channel 140). Thus, the system suffers a volume drop causing the particles to flow non-uniformly (e.g., spacing between the particles can be erratic). In some aspects, sorting can rely on predictability of position, velocity, and frequency of the particles. When the flow of the particles is non-uniform, sorting can be difficult, inefficient, and erroneous.

FIG. 2 shows a non-uniform droplet flow as described herein. As shown in FIG. 2A, water droplets 110 can have a non-uniform spacing when flowing in the primary channel 120. The non-uniform flow is caused by insufficient medium flowing into the primary channel 120 from the second secondary channels 150. FIGS. 2B and 2C show uniform water droplet 110 spacing provided by reinjecting into the primary channel the same volume of medium from the second secondary channels 150 that is received by the first secondary channels 140 during sorting. Additionally, FIG. 2D shows non-uniform water droplet 110 spacing caused by a greater volume of medium being reinjected from the second secondary channels 150 than is received by the first secondary channels 140. Thus, the volume of the medium being reinjected can control inter-particle or droplet spacing, inter-particle or droplet timing. Further, the volume of the medium being reinjected can be optimized on a system by system basis.

In certain embodiments, the system described herein can react to the velocity of the particles. For example, the system can monitor feedback and actively adjust system parameters to maintain a desired volumetric flow rate of the medium. In certain cases, the system can be employed to actuate a medium pump to control the volumetric flow rate of the medium (e.g., controlling the volumetric flow rate in the primary channel 120 or controlling the volumetric flow rate of the medium being reinjected from the second secondary channels 150). In some examples, a source of the feedback can be measuring the volumetric flow rate in any of the primary channel 120 or the second secondary channels 150. In some cases, a source of the feedback can be the particle detection described above. Controlling the volumetric flow rate of the medium can further control the inter-particle or droplet spacing, the inter-particle or droplet timing, and/or the particle or droplet positioning. For example, controlling the volumetric flow rate of the medium can maintain a constant inter-particle or droplet spacing and a constant inter-particle or droplet timing within a plurality of particles, vary the inter-particle or droplet spacing and inter-particle or droplet timing within the plurality of particles, grouping a subset of particles, agglomerating a subset of particles, or any combination thereof. In some non-limiting examples, the medium pump system can be a volume-driven system, a pressure-driven system (e.g., a positive pressure system (e.g., a pressure vessel or gravity-fed system) or a negative pressure system (e.g., a vacuum)), or an open loop system (e.g., an open-loop pressure-based system).

In certain embodiments, controlling the volumetric flow rate includes reinjecting the medium from the second secondary channels at a rate specific to a particular system or application. For example, as described herein in the examples of FIGS. 1-2D, the medium is reinjected at a rate of from about 500 nanoliters per minute (nL/min) to about 100 microliters per minute (L/min). For example, the medium can be reinjected at a rate of approximately 500 nL/min, 600 nL/min, 700 nL/min, 800 nL/min, 900 nL/min, 1 µL/min, 2 µL/min, 3 µL/min, 4 L/min, 5 µL/min, 6 µL/min, 7 L/min, 8 L/min, 9 L/min, 10 L/min, 11 L/min, 12 L/min, 13 L/min, 14 µL/min, 15 µL/min, 16 µL/min, 17 µL/min, 18 L/min, 19 L/min, 20 L/min, 21 L/min, 22 µL/min, 23 µL/min, 24 µL/min, 25 µL/min, 26 L/min, 27 L/min, 28 µL/min, 29 L/min, 30 µL/min, 31 µL/min, 32 µL/min, 33 µL/min, 34 µL/min, 35 µL/min, 36 µL/min, 37 µL/min, 38 µL/min, 39 µL/min, 40 µL/min, 41 µL/min, 42 L/min, 43 L/min, 44 µL/min, 45 L/min, 46 µL/min, 47 µL/min, 48 µL/min, 49 µL/min, 50 µL/min, 51 µL/min, 52 µL/min, 53 µL/min, 54 µL/min, 55 µL/min, 56 µL/min, 57 µL/min, 58 L/min, 59 µL/min, 60 µL/min, 61 L/min, 62 µL/min, 63 µL/min, 64 µL/min, 65 µL/min, 66 L/min, 67 L/min, 68 µL/min, 69 L/min, 70 µL/min, 71 µL/min, 72 µL/min, 73 µL/min, 74 L/min, 75 L/min, 76 µL/min, 77 L/min, 78 µL/min, 79 µL/min, 80 µL/min, 81 µL/min, 82 µL/min, 83 µL/min, 84 µL/min, 85 µL/min, 86 µL/min, 87 µL/min, 88 µL/min, 89 µL/min, 90 L/min, 91 L/min, 92 µL/min, 93 L/min, 94 µL/min, 95 µL/min, 96 µL/min, 97 L/min, 98 L/min, 99 µL/min, and/or 100 L/min.

Figure 3:
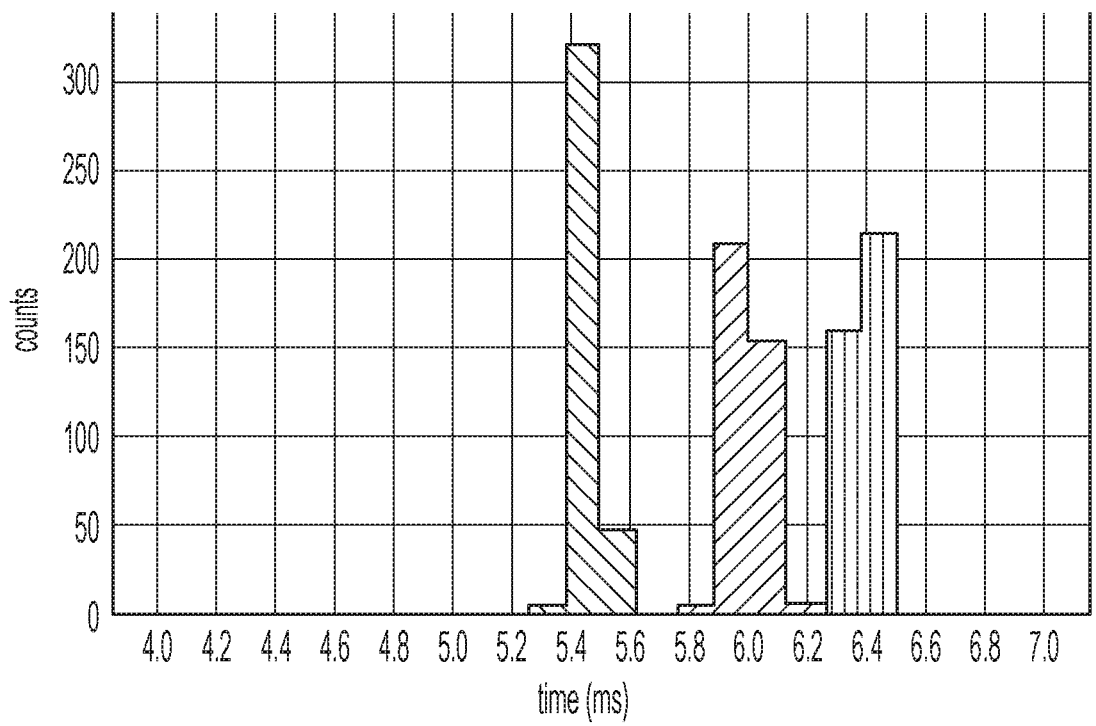
FIG. 3 is a graph showing the average time droplets take to move from a first sorting junction to a second sorting junction according to an embodiment described herein.
Figure 4:
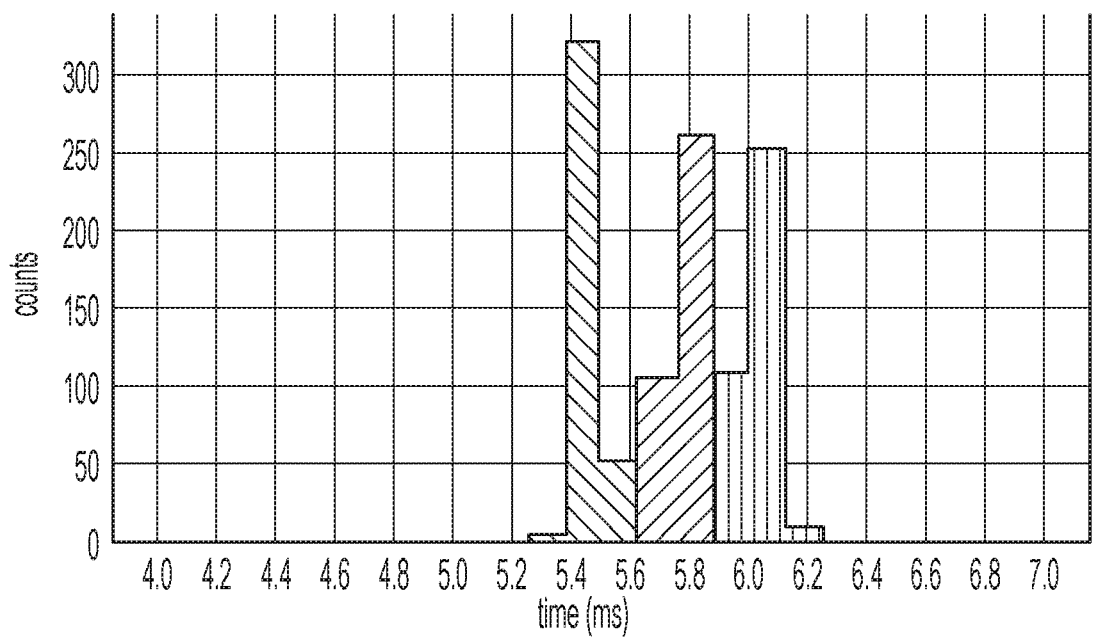
FIG. 4 is a graph showing the average time droplets take to move from a first sorting junction to a second sorting junction according to an embodiment described herein.
Figure 5:
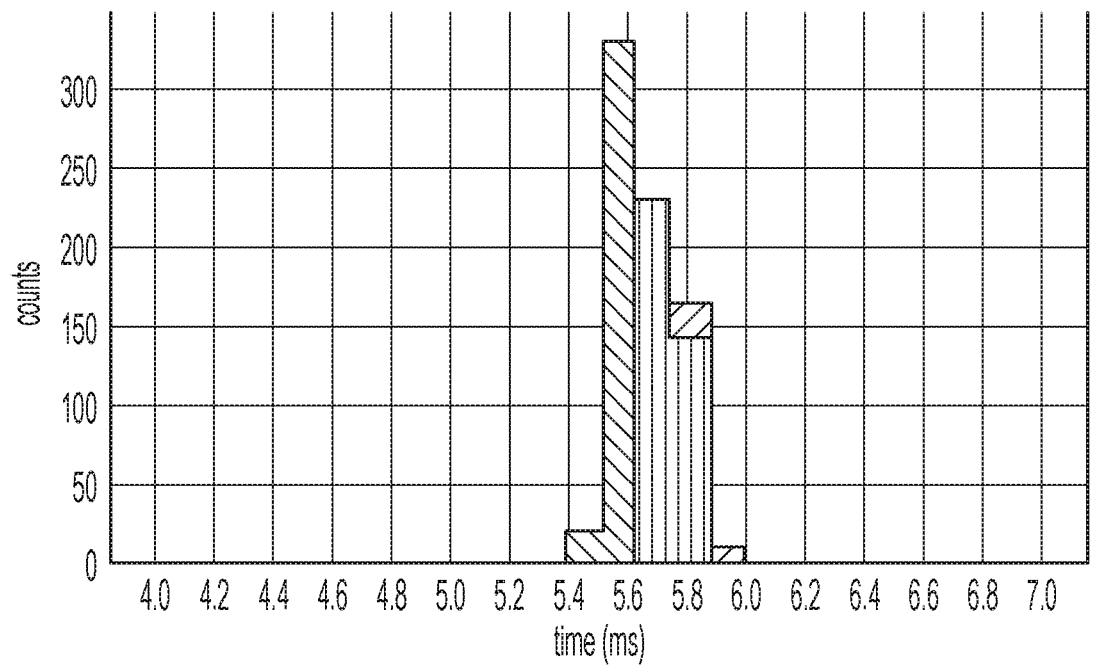
FIG. 5 is a graph showing the average time droplets take to move from a first sorting junction to a second sorting junction according to an embodiment described herein.
Figure 6:
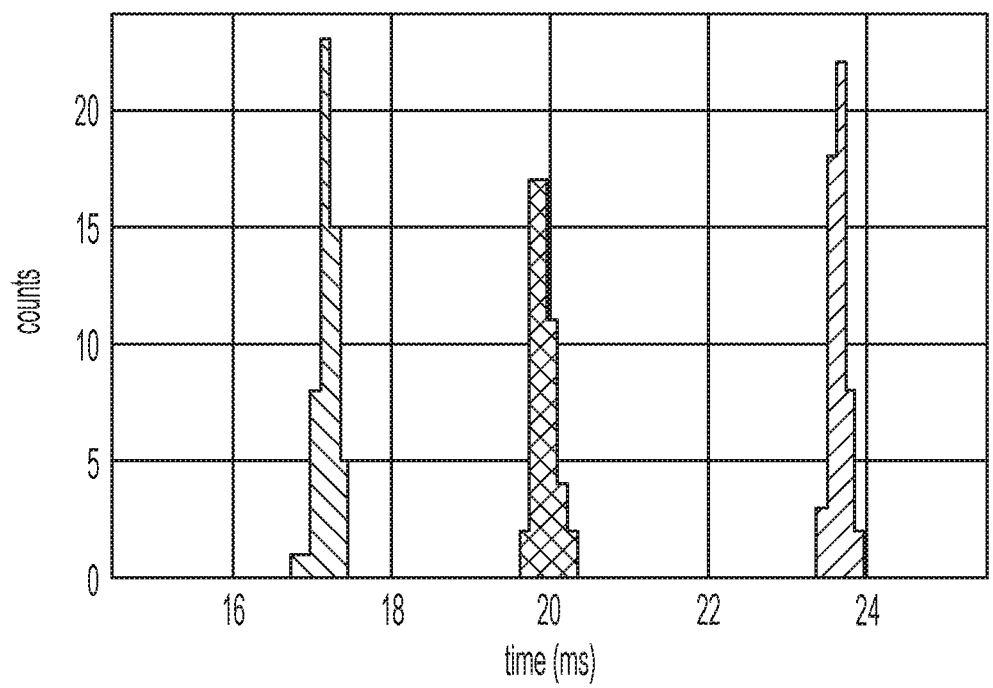
FIG. 6 is a graph showing the average time droplets take to move from a first sorting junction to a second sorting junction according to an embodiment described herein.

FIGS. 3-6 are graphs showing the effect of medium reinjection rate on particle or droplet velocity in the primary channel 120. For example, as shown in FIG. 3, a medium reinjection rate of 27 µL/min was used. The effect on inter-droplet spacing is shown as time spent between a first sorting junction and a second sorting junction (left-hatched (\\) histograms), time spent between the second sorting junction and a third sorting junction (right-hatched (//) histograms), and time spent between the third sorting junction and a fourth sorting junction (vertical-hatched (|||) histograms). As shown in FIG. 3, the time spent between sorting junctions increased as the droplet flowed through the primary channel 120, indicating the flow was slowing and not constant. In the example of FIG. 4, the medium reinjection rate was 30 µL/min. As shown in FIG. 4, the time spent between sorting junctions increased as the droplet flowed through the primary channel 120, also indicating the flow was slowing and not constant. In the example of FIG. 5, the time spent between sorting junctions was nearly equal, indicating a medium reinjection rate of 33 L/min was an optimal medium reinjection rate for the example system. Thus, for the system in the example of FIG. 5, the system was an ideal flow-controlled droplet sorting system. In a further example, FIG. 6 shows the effect of further reducing the medium reinjection rate to 13 µL/min. As shown in FIG. 6, the time spent between sorting junctions increased significantly (cross-hatched histograms), and indicated a drastic decrease in droplet velocity in the primary channel 120. Thus, a flow-controlled particle and/or droplet sorting system as described herein provides facilitated particle sorting.

VI. Examples

These illustrative examples are given to introduce the reader to the general subject matter discussed here and are not intended to limit the scope of the disclosed concepts. The following sections describe various additional features and examples with reference to the drawings in which like numerals indicate like elements, and directional descriptions are used to describe the illustrative embodiments but, like the illustrative embodiments, should not be used to limit the present disclosure. The elements included in the illustrations herein may not be drawn to scale.

Figure 7:
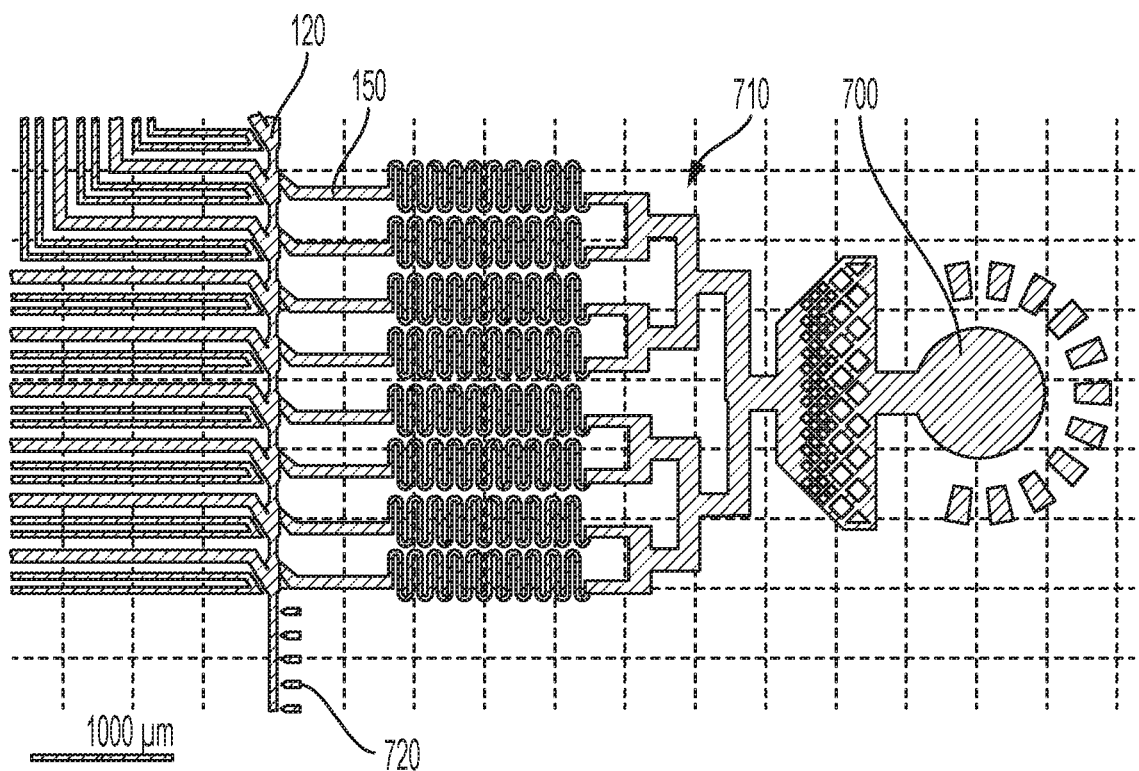
FIG. 7 is a schematic of a medium inlet and manifold system according to an embodiment described herein.

FIG. 7 is a schematic showing a medium inlet 700, a manifold system 710, and multiple second secondary channels for reinjecting medium according to certain embodiments. The second secondary channels 150 can have any suitable geometry. In some examples, as in the example of FIG. 7, the second secondary channels 150 of a manifold system 710 all have the same geometry. In certain embodiments, the second secondary channels 150 can have different geometries, as compared to each other. Different geometries can provide tailored medium reinjection across the length of the primary channel 120. Alignment markers 720 can be used to indicate where, in the example of an optical sensor, laser light can illuminate the primary channel 120 to excite fluorescent materials in the water droplet 110 for identification and sorting.

Figure 8:
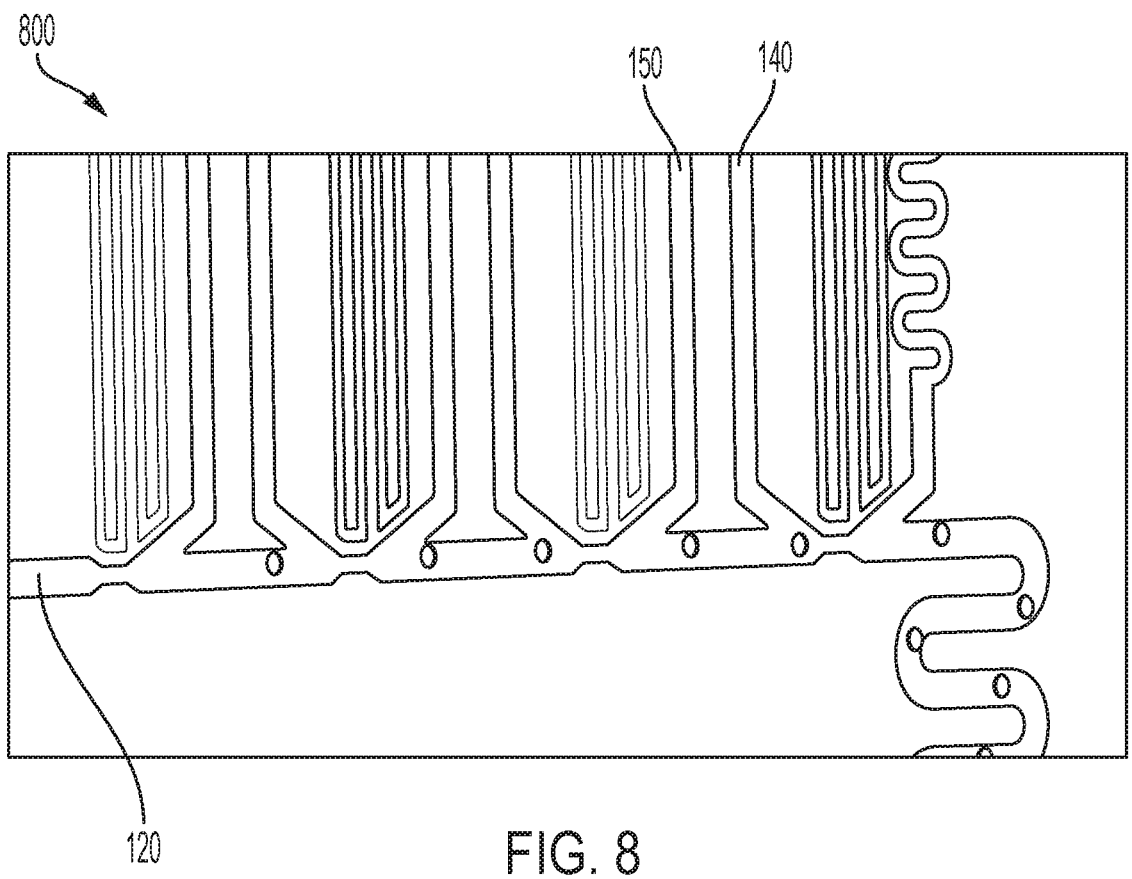
FIG. 8 is an illustration of a micrograph showing droplets flowing in a channel according to an embodiment described herein.

FIG. 8 shows an alternate flow-controlled particle sorting system 800. In the example of FIG. 8, the first secondary channel 140 and the second secondary channel 150 are positioned on the same side of the primary channel 120. In some non-limiting examples, positioning the first secondary channel 140 and the second secondary channel 150 on the same side of the primary channel 120 can maintain particle position within the primary channel by slightly forcing the particles away from the sorting junction to offset the particles drifting toward the sorting junction due to the medium flowing into the first secondary channel 140.

Figure 9:
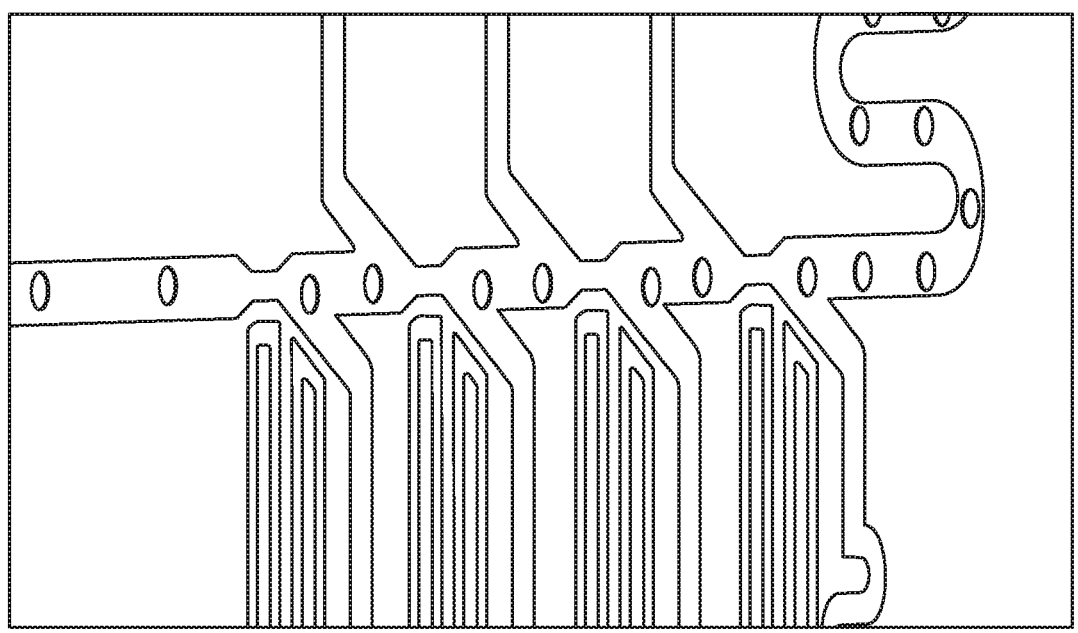
FIG. 9 is an illustration of a micrograph showing droplets flowing in a channel according to an embodiment described herein.

In certain embodiments, the flow-controlled particle sorting system 100 can be configured to maintain a constant ratio of the medium split from the primary channel 120 and received by the first secondary channel 140. For example, 30% of the medium can be directed into the first secondary channel 140 at every sort junction. In some aspects, the ratio can provide sufficient medium to perform the sorting and control the velocity of the particles. The medium reinjection rate can be equal to the volumetric flow rate of the medium into the first secondary channel 140 at each sorting junction. For example, a volumetric flow rate into the primary channel of 20 µL/min having a sort ratio of 30% across four sorting junctions can require a medium reinjection rate of 18 µL/min (e.g., 0.3×20 µL/min×3 junctions=18 µL/min). FIG. 9 is an illustration of a micrograph showing equal inter-droplet spacing as provided by optimizing the medium reinjection rate.

The foregoing description of the embodiments, including illustrated embodiments, has been presented only for the purpose of illustration and description and is not intended to be exhaustive or limiting to the precise forms disclosed. Numerous modifications, adaptations, and uses thereof will be apparent to those skilled in the art.

What is claimed is:

1. A method of controlling a volumetric flow rate in a microfluidic particle sorting system, comprising:
   (a) passing a medium containing a plurality of particles through a primary channel at a selected volumetric flow rate to a sensor to sense at least a subset of the particles;
   (b) passing the medium with the sensed subset of particles to a first sorting junction comprising the primary channel connected to a first secondary channel and a second secondary channel;
   (c) sorting the sensed subset of particles from the primary channel into the first secondary channel; and
   (d) reinjecting a medium devoid of particles from the second secondary channel into the primary channel, wherein the reinjection of the medium from the second secondary channel maintains the selected volumetric flow rate in the primary channel.

2. The method of claim 1, wherein the selected volumetric flow rate controls inter-particle spacing, inter-particle timing, particle positioning, or any combination thereof, within at least the primary channel.

3. The method of claim 2, further comprising manipulating the inter-particle spacing, the inter-particle timing, and the particle positioning.

4. The method of claim 3, wherein the manipulating comprises maintaining a constant inter-particle spacing and a constant inter-particle timing within the plurality of particles, varying the inter-particle spacing and inter-particle timing within the plurality of particles, grouping a subset of particles, agglomerating a subset of particles, or any combination thereof.

5. The method of claim 1, wherein the selected volumetric flow rate controls inter-particle spacing, inter-particle timing, particle positioning, or any combination thereof, within at least the first secondary channel.

6. The method of claim 1, wherein the sorting comprises dielectrophoretic manipulating and carrying by the medium.

7. The method of claim 6, wherein the dielectrophoretic manipulating comprises inducing a dipole moment in the subset of the particles.

8. The method of claim 7, wherein inducing the dipole moment in the subset of particles forces the subset of particles into the first secondary channel.

9. The method of claim 6, wherein the carrying by the medium comprises employing an initial volumetric flow rate of the medium flowing into the first secondary channel with the subset of particles.

10. The method of claim 1, wherein reinjecting the medium devoid of particles comprises reinjecting a volumetric flow rate of the medium devoid of particles equal to the volumetric flow rate of the medium flowing into the first secondary channel with the sensed subset of particles.

* * * * *